Sept. 16, 1924.

H. H. DOERING

ICE CREAM CUTTING MACHINE

Filed July 18, 1921

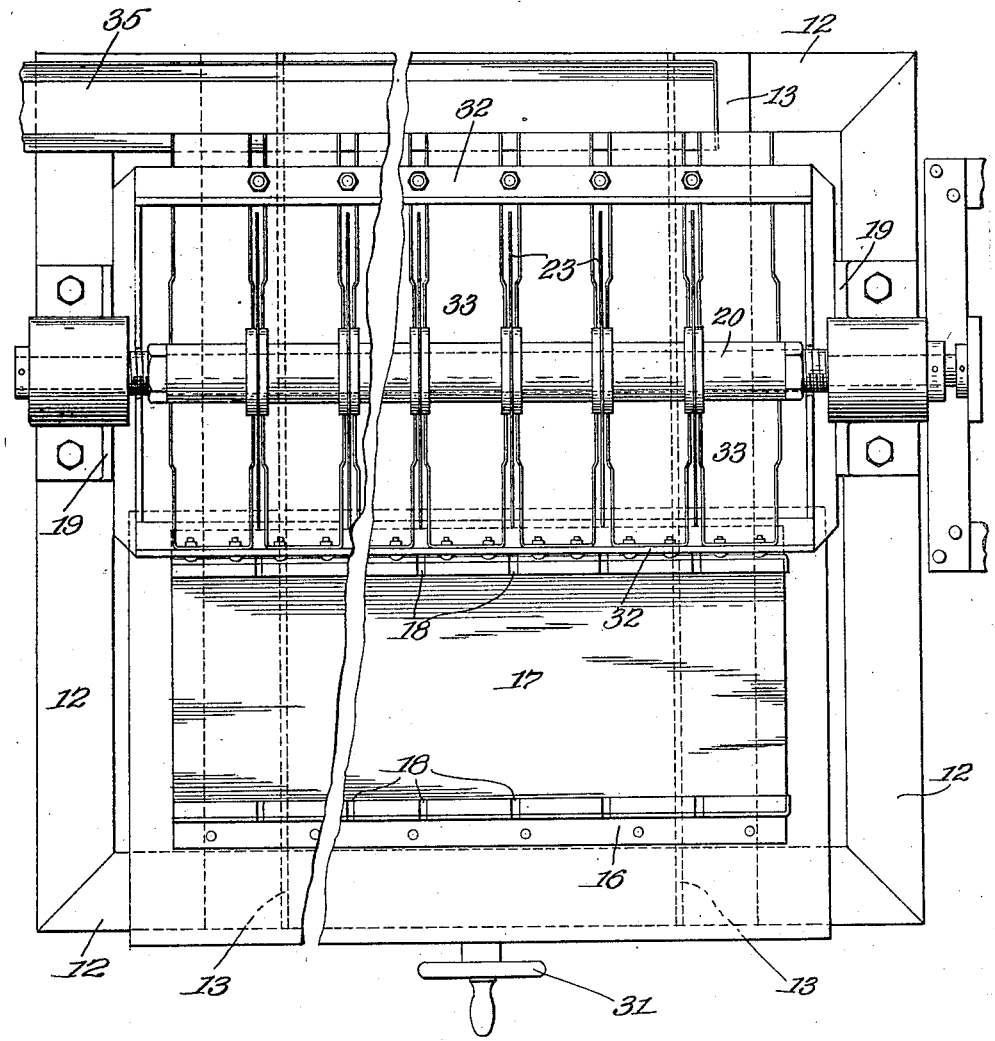

Sept. 16, 1924.

H. H. DOERING

ICE CREAM CUTTING MACHINE

Filed July 18, 1921

Witness:
P. J. Gathmann

Inventor:
Henry H. Doering,
By Heidman & Street
his Attorneys

Patented Sept. 16, 1924.

1,508,778

UNITED STATES PATENT OFFICE.

HENRY H. DOERING, OF CHICAGO, ILLINOIS.

ICE-CREAM-CUTTING MACHINE.

Application filed July 18, 1921. Serial No. 485,572.

*To all whom it may concern:*

Be it known that I, HENRY H. DOERING, a citizen of the United States, and a resident of Chicago, in the county of Cook and State of Illinois, have invented certain new and useful Improvements in Ice-Cream-Cutting Machines, of which the following is a description, reference being had to the accompanying drawings, which form a part of my specification.

My invention relates to a machine more especially intended for cutting brick ice cream; the invention having for its object the provision of a machine adapted to cut the molded or frozen cream into blocks or bricks of desired size without necessitating the handling or physical contact on the part of the operator with the cream.

One object of my invention is to provide a construction whereby the molded or frozen cream may be cut into a multiple of similar sized bricks or portions; the cutting mechanism being so arranged that a clean cut or separation will be provided; while at the same time any cream or substance adhering to the cutting mechanism will be discharged into and conveyed by suitable means into a vessel or receptacle to permit the same to be reclaimed and refrozen; the invention also contemplating a construction whereby the degree of movement or operation of the cream containing holder may be controlled.

The objects and advantages of my invention will all be more fully comprehended from the following detailed description of the drawings, wherein:—

Figure 2 is a top plan view thereof with portions removed and shown broken away.

Figure 3 is a longitudinal vertical sectional view.

Figure 4 is a detail sectional view of one of the table-supporting castors and runway.

Figure 1:
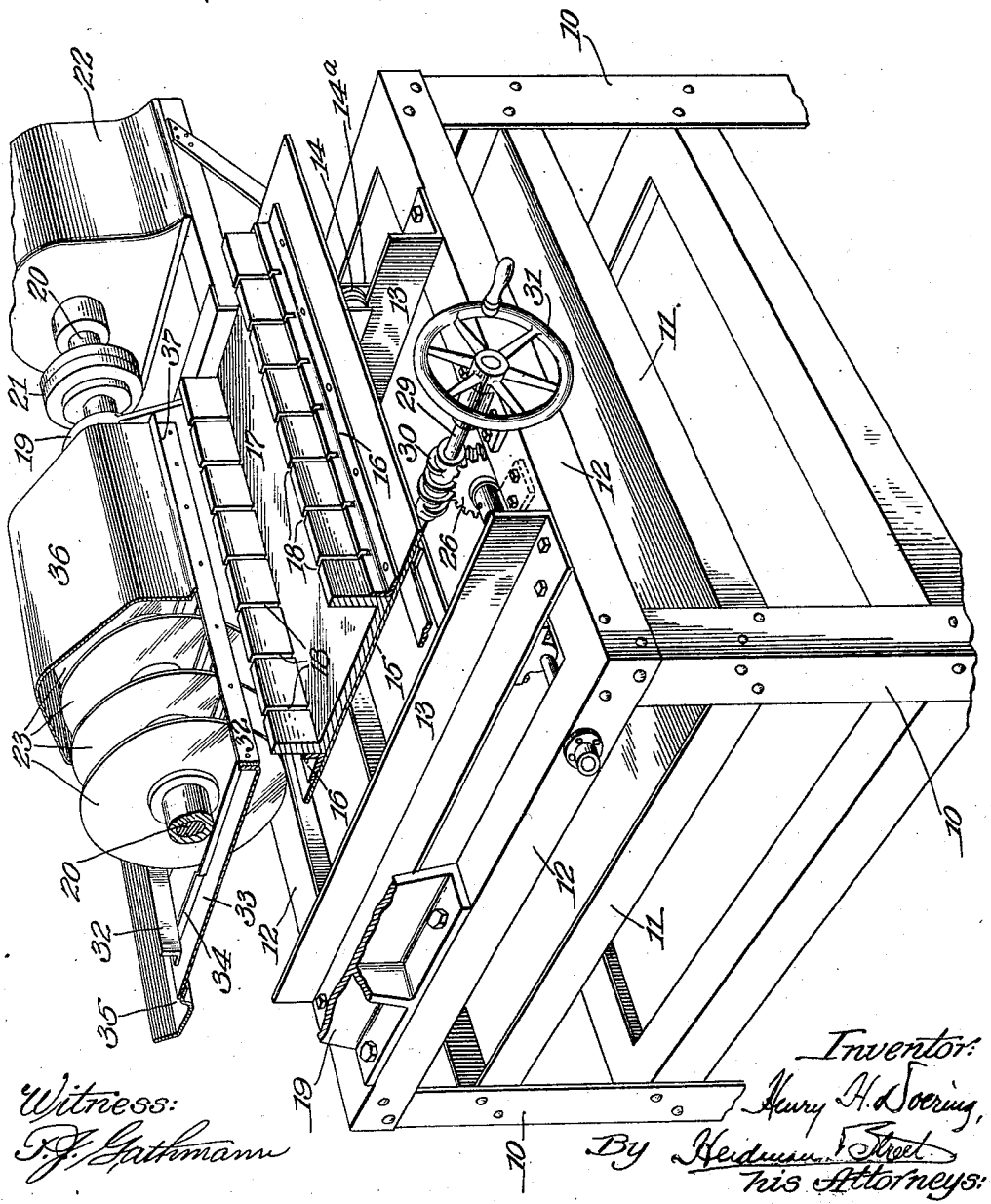
Figure 1 is a perspective view of my improved machine with a portion of the power-imparting means or motor broken away.

In the exemplification of the invention as disclosed in the drawings, it consists of a suitable supporting frame 10 comprising uprights and connecting cross members, all preferably formed of angle or channel iron and provided at a point intermediate of the top and bottom with a suitable trough at 11 adapted to receive any material that may drip through the machine from the cutting table. The top cross members 12 are provided with angle irons 13, 13 adapted to constitute runways or tracks for the grooved wheels or castors 14, shown in detail in Figure 4; the castors being secured by means of suitable brackets 14ª to the lower side of a table 15, which is shown provided with a pair of grooved wheels or castors on each side thereof. The table 15 is shown provided with a pair of spaced stops or angles 16, 16 arranged a suitable distance apart to receive a cream-holding frame or tray 17 therebetween; the upstanding portions of the two angles 16, 16 being extended at the ends and bent toward each other as shown in Figure 2. The frame or tray 17 is preferably made of wood and open at its ends as more clearly shown in Figure 1, while the upstanding sides of the tray are each provided with series of slots 18 extending throughout the height of the sides, with the slots of both sides arranged in alignment. These slots are formed equi-distances apart and in keeping with the spacing of a cutting mechanism later to be described, and therefore correlated to the size of prints or bricks it is desired to provide.

Secured to the top members 12 of the supporting frame 10 and at opposite sides thereof, are a pair of pillars or supporting members 19, a portion of one of which is shown broken away in Figure 1. These brackets or supporting members 19 are adapted to provide bearing for a rotatable shaft 20 which is intended to be operatively secured to or placed into operative relation with the power-imparting element; as for example, by means of a suitable clutch coupling indicated at 21 whereby the shaft 20 is placed into operative relation with the shaft of an electric motor which is indicated at 22 in Figure 1. The shaft 20 is disposed transversely of the runway or track 13—13 and therefore is disposed transversely of the path of the tray-supporting table 15. The revoluble shaft 20 is supported a sufficient distance above the plane or path of the table 15 with its tray 17 to permit the attachment of suitable cutters or knives 23 to the shaft; the cutters being preferably of the circular or disc form shown in Figures 1 and 3. The knives or cutters are secured to the shaft 20 to rotate therewith and are arranged predetermined and equi-distances apart so as to cut the material or cream into uniform portions or bricks of the desired width. The sides of the tray 17 have their slots 18 arranged at distances apart corresponding with the spacing of the cutters or knives 23 in order that said cutters or knives may freely pass through the slots when the table 15 with its tray 17 is forced beneath the cutting mechanism by the operator.

As a suitable means for operating the table 15 it is provided on its bottom with a link or arm 24 pivotally secured thereto; the lower end of the link or arm 24 in turn being pivotally secured to a second link or arm 25 which latter is pivotally secured at its opposite end to a member of the supporting frame or table 10. At a suitable point, preferably in proximity to the front or feed side of the machine and beneath the top thereof, I rotatably mount a worm-gear 26 provided with a crank-arm or lever 27 which is pivotally connected with one end of a link 28 whose opposite end is pivotally secured to the link or arm 24 at a point intermediate of its ends. In proximity to the worm-gear 26 I rotatably mount a shaft 29 provided with a worm 30 arranged in mesh with the worm-gear 26, while the outer end of the shaft 29 is provided with a suitable operating handle or crank as at 31. The worm-gear with its crank-arm 27 and the length and pivot connections of the respective links are so correlated that a complete rotation of the worm-gear 26 will cause the table 15 to travel toward the opposite side of the machine and to be returned to its initial or starting point, namely to be returned to the operator's or loading side of the machine. With the construction of feeding mechanism just described, it is apparent that proper movement of the table with the cream-holding tray beneath the cutting mechanism will at all times be ensured and the cream completely severed or cut into separate bricks or portions while at the same time obviating any necessity for the operator's hands to come into proximity with the cutting mechanism.

I provide a frame consisting of members 32 disposed intermediate of the supporting brackets or pillars 19 and arranged diametrically at opposite sides of the cutting mechanism, see Figures 1 and 3; the frame members 32 being adapted to provide support for a series of conveying members or gutters 33 which are arranged at the sides of and intermediate of the cutting discs or knives 23, as more clearly shown in Figure 2. The conveyors or gutters 33 are provided with upstanding edges or flanges 34 preferably arranged in close proximity to the knives at points adjacent the hubs thereof. The gutters 33 are so secured to the frame members 32 that they will be disposed at a slight inclination adapted to convey the material, which may adhere to the knives and which is subsequently discharged onto said gutters toward one side, preferably the rear side of the cutting mechanism, where all of the conveyers or gutters 33 communicate with a trough or main gutter 35. The trough 35 is formed so that it will discharge at one end into a suitable receptacle or vessel placed beneath the discharging end. The gutters 33 are arranged intermediate of the different knives 23, as shown in Figure 2, and are adapted to catch the particles of ice cream that may adhere to the knives so that these particles may be reclaimed and again refrozen in the freezing machine.

The frame members 32 also provide support for a hood or cover 36, the edges whereof are bent back or provided with lug portions as at 37 adapted to rest on the frame members 32. The hood or cover 36 is adapted to encase the upper portion of the knives 23 and thus prevent any possible contact on the part of the operator with the knives; the lower portion of the knives, however, being exposed and sufficient space beneath the shaft 20 and frame members 32 and gutters 33 being provided for the passage of the table with the cream-holding tray.

I prefer to operate my improved machine with an electric motor directly connected with the knife-carrying shaft and the cutting knives are caused to rotate in clockwise direction in Figure 1 and counterclockwise direction in Figure 3, namely in a direction downwardly toward the cream-holding tray 17 so that as the knives enter the cream there will be no tendency on the part of the knives to lift the cream in the tray.

Upon proper operation of the feeding mechanism consisting of the crank 31 with the worms and links previously described, the table 15 with its superposed tray 17 (which will be held against movement by the stop members 16) will be caused to move along the runways 13 thereby passing the tray 17 with its block or slab of cream beneath the knives which latter pass through the slots 18 of the tray.

In practice, the cream is frozen in block or slab form in suitable containers lined with paraffin paper or the like; the cream with the paper being discharged from said containers onto the trays and my improved machine is intended to operate on the frozen block or slab of cream with its wrapping of paraffin paper so that the mass will be cut into brick form without necessitating handling or actual contact of the cream with the hands of the operator; the trays 17 being of length sufficient to receive the frozen slab or block. It will be understood that the size of the trays and the number of knives may vary in accordance with the size of frozen blocks or slabs and that the machine may be made of any desired capacity to cut the cream into any number of bricks, which may readily be removed from the tray 17 onto a suitable wrapping table where the cream is provided with the final or outside wrapping.

I have described my invention in terms and expressions employed for purposes of description and not as terms of limitation, because structural modifications are possible and may be made without, however, departing from the spirit of my invention.

What I claim is:—

1. A machine of the character described, comprising a supporting frame provided with a runway, a table slidable on said runway and provided with a cream-holding portion, cutting means arranged transversely of and in a plane above the runway, means whereby the table may be reciprocated through the path of said cutting means, and means disposed adjacent to the cutting means for receiving and collecting the cream adhering thereto.

2. A machine of the character described, comprising a supporting frame provided with a runway, a table adapted to move along said runway, a series of cutting discs rotatably mounted above the runway, a cream-holding tray removably mounted on the table and provided with series of cutter-receiving slots at predetermined distances apart, and a series of troughs disposed intermediate of and adjacent to the cutting discs, all of said troughs being provided with a common discharge.

3. A machine of the character described, comprising a supporting frame, a table slidably mounted on said frame and provided with a cream-holding portion, a revolubly mounted shaft arranged transversely of and in a plane above the path of the table, said shaft being provided with a plurality of cutting discs or knives arranged predetermined distances apart, means whereby said shaft may be rotated, a series of troughs arranged adjacent to and intermediate of the cutting discs, and a trough common to all of said troughs for receiving the material therefrom.

4. A machine of the character described, comprising a supporting frame, a table slidably mounted thereon and provided with a cream-holding portion, a revolubly mounted shaft arranged in a plane above and transversely of the table, said shaft being provided with a plurality of cutting discs or knives, a series of troughs arrange adjacent the sides of said cutting discs and adapted to discharge toward one end of the machine, a trough common to all of said first mentioned troughs for receiving the material therefrom, and means whereby the table may be reciprocated through the orbit of said cutting discs.

5. A machine of the character described, comprising a supporting frame, a table adapted to travel on said frame and provided with guide members, a cream-holding tray adapted to be disposed between the guide members of the table, said cream-holding tray having open ends and upstanding sides provided with slots at predetermined distances apart, a revolubly mounted shaft arranged in a plane above the table, said shaft being provided with a plurality of cutting discs adapted to pass through the slots in the sides of the cream-holding tray when the latter passes therebeneath, means adjacent to said cutting discs for receiving adhering material therefrom, a member common to all of said last mentioned means for receiving the material therefrom, a shield disposed across the top of said cutting discs, and means whereby the table may be reciprocated through the orbit of said cutting discs.

6. A machine of the character described, comprising a supporting frame provided with a runway, a table adapted to move along said runway, means pivotally connected to the table and to the supporting frame and provided with an intermediate yielding point, gear mechanism having crank and link connection with said means at a point intermediate of said yielding point and the point of connection of said means with the table, the intermediate yielding point, crank and link connection being so correlated that one revolution of the gear mechanism will cause complete reciprocation of the table, a series of cutting discs rotatably mounted above said runway, a cream-holding member, provided with slotted sides for the passage of said cutting discs, adapted to be carried by the table, and means whereby the position of the cream-holding member, relative to the cutting discs, may be controlled.

HENRY H. DOERING.

Witnesses:
G. HEIDMAN,
F. A. FLORELL.